United States Patent
Tokuda et al.

(10) Patent No.: US 6,735,581 B2
(45) Date of Patent: May 11, 2004

(54) FOURIER SERIES-BASED AUTOMATIC GENERATION SYSTEM AND METHOD FOR MULTI-VARIABLE FUZZY SYSTEMS

(75) Inventors: Naoyuki Tokuda, Tokyo (JP); Liang Chen, Tokyo (JP); Hiroyuki Sasai, Tokyo (JP)

(73) Assignee: SunFlare Co., Inc., Tokyo (JP)

( * ) Notice: Subject to any disclaimer, the term of this patent is extended or adjusted under 35 U.S.C. 154(b) by 345 days.

(21) Appl. No.: 09/849,985

(22) Filed: May 8, 2001

(65) Prior Publication Data
US 2003/0217020 A1 Nov. 20, 2003

(51) Int. Cl.$^7$ .............................. G06F 9/44; G06N 7/02; G06N 7/06

(52) U.S. Cl. .............................. 706/52; 706/45; 706/46

(58) Field of Search ............................. 706/52, 45, 46

(56) References Cited

PUBLICATIONS

Liang Chen et al, A new approach for the automatic generation of membership functions and rules of multi–variable fuzzy systems, Nov. 1–Dec. 1, 1995, IEEE, 0–7803–2768–3/95, 1342–1346.*

Pyeong G. Lee et al, An index of applicability for decomposition method of multivariable fuzzy systems, Aug. 1995, IEEE, 9412929, pp. 364–369.*

James N. K. Liu et al, Fuzzy knowledge system and machine maintenance, Nov. 1996, IEEE, Proc. 1996 Australian New Zealand Conf. on Inelligent Information Systems.*

1995 IEEE International Conference on Neural Networks Proceedings The University of Western Australian Perth, Western Australia 27–Nov.–Dec. 1, 1995, vol. 3, p. 1342 "A New Approach for the Automatic Generation of Membership Functions and Rules of Multi–Variable Fuzzy System".

Fuzzy Sets and Systems 120 (2001) pp. 323–329 "A new scheme for an automatic generation of multi–variable fuzzy systems".

Comp. Rend. Acad. Sci. Paris, 1847, pp. 536–538, Méthode Générale pour la resoltion des systémes d'équations simultanées.

* cited by examiner

Primary Examiner—Anil Khatri
Assistant Examiner—Joseph P. Hirl
(74) Attorney, Agent, or Firm—Jacobson Holman PLLC

(57) ABSTRACT

A method of automatically generating a multi-variable fuzzy inference system using a Fourier series expansion. Sample sets are decomposed into a cluster of sample sets associated with given input variables. Fuzzy rules and membership functions are computed individually for each variable by solving a single input multiple outputs fuzzy system extracted from the set cluster. The resulting fuzzy rules and membership functions are composed and integrated back into the fuzzy system appropriate for the original sample set with a minimal computational cost. In addition, an overall system error can be related to errors at each stage of decomposition and composition, enabling error bounds or accuracy thresholds for each stage to be specified and ensuring the final precision of the resulting fuzzy system on the original sample set.

11 Claims, 2 Drawing Sheets

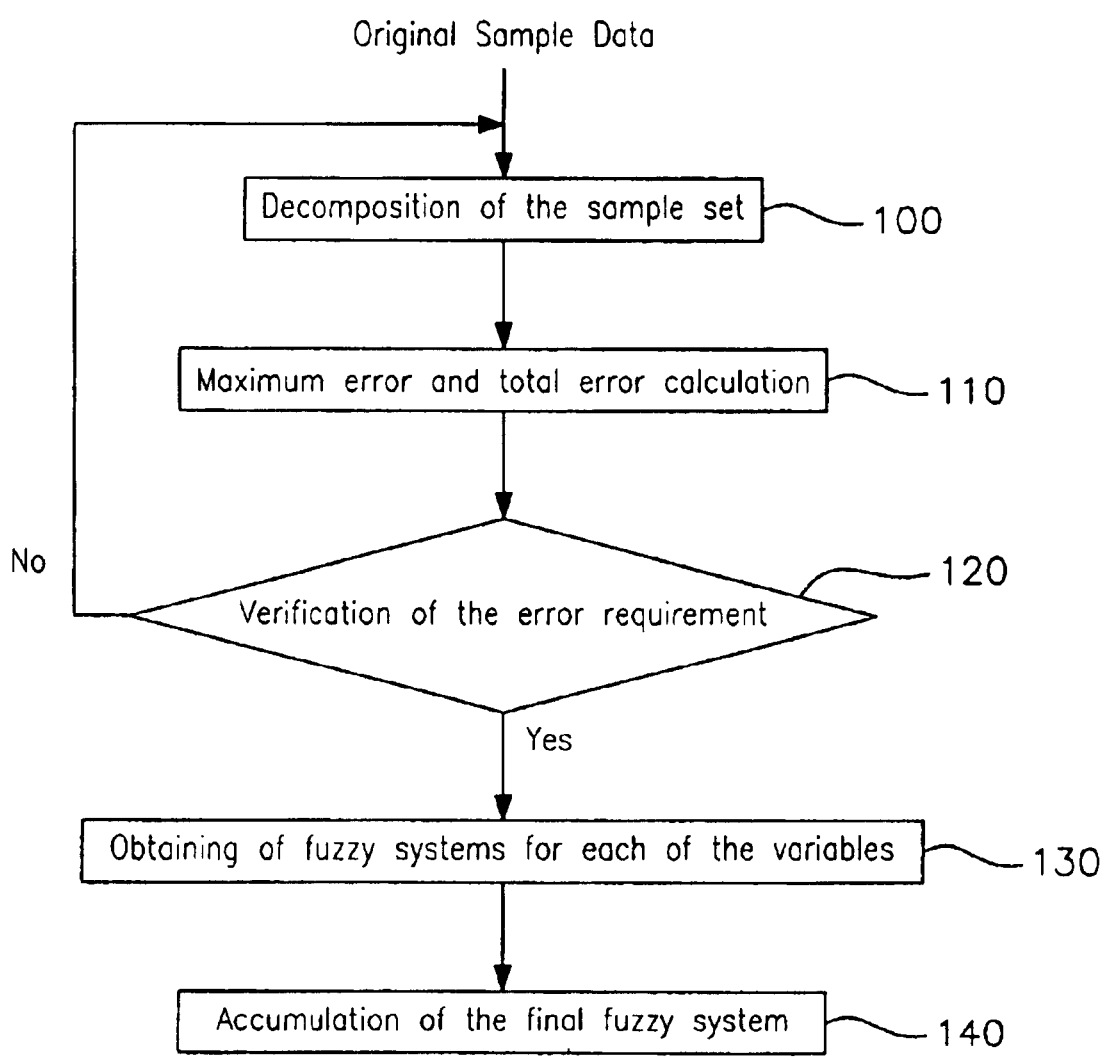

FOURIER SERIES-BASED AUTOMATIC GENERATION SYSTEM AND METHOD FOR MULTI-VARIABLE FUZZY SYSTEMS

BACKGROUND OF THE INVENTION

1. Field of the Invention

The present invention is related to the field of fuzzy logic and, more particularly, to a system and method for automatically generating a multi-variable fuzzy inference system from given sample sets.

2. Description of the Related Art

It is well known that the fuzzy system is extremely effective in approximating any continuous function on a compact set. The fuzzy system most often provides a powerful alternative to the conventional control system, particularly for complex or ill-defined systems where the system is not easily controllable by a conventional controller. This is so because the fuzzy system is capable of capturing the approximate, qualitative aspects of human knowledge and reasoning needed in the control system. Accordingly, fuzzy systems have recently found an increasingly wider range of applications in industrial applications, household appliances as well as in financial analysis. The applications can include various manufacturing processes, robotics, consumer products such as heat exchangers, warm water pressure control, aircraft flight control, robot control and manipulation, car speed control, power systems and nuclear reactor control, control of a cement kiln, focusing of a camcorder, climate control for buildings, train scheduling, pattern recognition and system modeling, stock trading on a stock exchange and information retrieval, to mention only a few.

It is normally the domain human experts who manually code and refine the fuzzy systems. The performance of a fuzzy system depends critically on the depth of the experts' understanding of the domain knowledge. Accordingly, the cost of developing a fuzzy system has greatly increased, creating a bottleneck in the application of many complex fuzzy systems in new areas. This has motivated an intensive study of the automatic generation of fuzzy systems, and the subject has often been studied as a data-driven, self-adaptive problem.

In implementing self-adaptive problems by fuzzy systems, one of the biggest problems encountered is what is referred to as a dimensional explosion predicament which is associated with an exponential explosion in the required computational time as the number of variables increases. This is so because the relationship among the multi-variables of the fuzzy rules and membership functions is often quite complicated and more often than not is nonlinear. Because of this, almost all of the existing commercial works available can only deal with a relatively small number of input variables, typically a maximum of five.

In "A New Approach for the Automatic Generation of Membership Functions and Rules of Multi-Variable Fuzzy System", (Proceedings of IEEE 1995 International Conference on Neural Networks, Perth, Australia, pp. 1342–1346), Chen et al. presents a new algorithm, PolyNeuFuz, based on polynomial approximation. PolyNeuFuz was later improved to ParNeuFuz, as discussed by Chen et al. in "A New Scheme for an Automatic Generation for Multi-Variable Fuzzy Systems", to be published in Fuzzy Sets and Systems, 120 (2001), no. 2, pp. 143–149. ParNeuFuz can, in principle, be run in parallel processing if the independence of the input variables is exploited.

Both PolyNeuFuz and ParNeuFuz solve the problem of generating multi-variable fuzzy systems by decomposing the problem to a solution of single input, multiple output fuzzy systems. The ParNeuFuz algorithm exploits a polynomial expansion in approximating the given sample sets, and the time complexity of the algorithms does not depend too heavily on the number of variables used. In principle, both of these algorithms can be applied to generate a fuzzy system with a large number of variables. PolyNeuFuz and ParNeuFuz successfully decompose a self-adaptive problem of multi-variable systems into several steps, and into parallel steps for ParNeuFuz in particular, thus considerably reducing the computational complexity. However, unlike the Fourier series-based approach which is able to provide an accurate error estimate in each of these steps, in decomposition as well as in composition, error estimation or prediction is not easy using the PolyNeuFuz and ParNeuFuz methods.

Accordingly, a need exists for a scheme capable of generating a multi-variable fuzzy inference system that does not encounter the dimensional explosion predicament known in the prior art, while enabling error estimation and prediction.

SUMMARY OF THE INVENTION

In view of the foregoing, one object of the present invention is the development of a new Fourier series-based automatic generation scheme of a multi-variable fuzzy inference system that avoids a dimensional explosion predicament.

Another object of the invention is to provide a method that is capable of generating and computing the fuzzy rules and membership functions for each variable independently of the other variables.

A further object of the invention is to provide a Fourier series-based decomposition supporting error analysis that can specify the error bounds or accuracy thresholds at each stage of decomposition and composition to ensure the final precision of the resulting fuzzy system on the original sample set.

In accordance with this and other objects, the present invention presents a novel method of automatically generating a multi-variable fuzzy inference system for any number of practical applications. The method exploits the Fourier series expansion in decomposing the sample sets into simplified tasks of generating a fuzzy system with a single input variable independent of the other variables. The method begins by decomposing a sample set, e.g., $\Lambda$, into an accumulation of a number of set clusters associated with the given input variables, and computing the fuzzy rules and membership functions for each variable, independently of the other variables, by solving a single input multiple outputs fuzzy system extracted from the set cluster. The resulting decomposed fuzzy rules and membership functions are integrated back into the fuzzy system appropriate for the original sample set $\Lambda$, requiring only a moderate computational cost.

The method described in this invention can be used to obtain a stable fuzzy system by retaining any specified accuracy of the resulting multi-variable function on the original sample set. In other words, by taking advantage of the fact that the decomposition is based on a Fourier series, a careful error analysis indicates the relationship between an overall system error and errors at each stage of decomposition and composition so that error bounds or accuracy thresholds of each of these steps may be specified to ensure the final precision of the resulting fuzzy system on the original sample set.

These and other features of the invention, as well as many of the intended advantages thereof, will become more readily apparent when reference is made to the following description taken in conjunction with the accompanying drawings.

BRIEF DESCRIPTION OF THE DRAWINGS

FIG. 2 is a flow diagram of the method for the automatic generation of multivariable fuzzy system from a sample set, in accordance with the present invention.

DETAILED DESCRIPTION OF THE PREFERRED EMBODIMENTS

Figure 1:
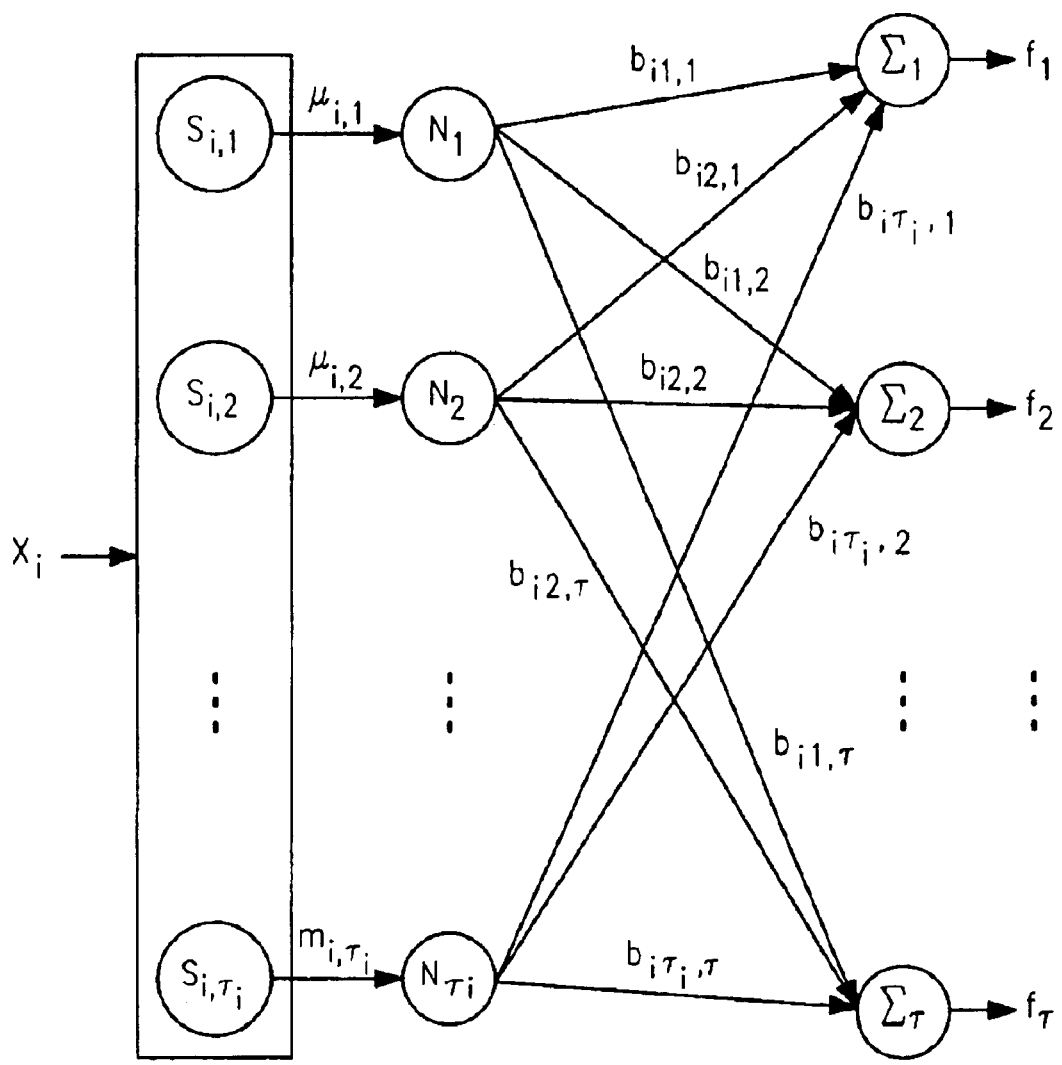
FIG. 1 is a diagram of a neural network structure used for generating fuzzy systems of single input and multiple outputs, in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

To begin, the main theoretical supports for the present invention will be summarized, followed by a discussion of two supplementing methods. Throughout this document, the number of samples is referred to as N, and the number of input variables is referred to as m, with both N and m being finite.

The main theoretical supports for the present invention include the following two theorems.

Theorem 1

For any sample set $\Lambda=\{(\overline{X}_j,Y_j)|j=1,2,\ldots,N\}$, where $\overline{X}_j=(X_{1,j},X_{2,j},\ldots,X_{m,j})$ and $L_i \leq X_i \leq H_i$ for all i, there exists a set $\{a_{\bar{s}} \neq 0 | \bar{s}=(s_1,s_2,\ldots,s_{2m}) \in S, s_2, s_4, \ldots s_{2m} \in \{0,1\}$, with $s_1, s_3, \ldots, s_{2m-1}$ being non-negative integers$\}$, and a sample set cluster $A=\{A_{\bar{s}}=\{(\overline{X}_j, F_{\bar{s}j})|j=1,2,\ldots,N\}|\bar{s}=(s_1,s_2,s_2,\ldots,s_{2m}) \in S\}$, such that $$Y_j = \sum_{\bar{s} \in S} F_{\bar{s}j}, \text{ where}$$

$$F_{\bar{s}j} = a_{\bar{s}} \prod_{i=1}^{m} \cos\left(\frac{2\pi s_{2i-1}}{U_i - L_i} \cdot \left(X_{i,j} - \frac{U_i - L_i}{2}\right) + s_{2i} \cdot \frac{\pi}{2}\right).$$

Theorem 2

Suppose that the single input multiple outputs sample set $\tilde{B}_i=\{(X_{i,j},\{f_{\bar{s}},i,j|\bar{s} \in S\})|j=1,2,\ldots,N\}$ $(|f_{\bar{s}},i,j| \leq 1)$ can be described by the following fuzzy system $MFS_i$, with a maximum error for each output and the sum of errors for each output being given by $\max_{j \in \{1,2,\ldots,N\}}|O_{fuzzy}(X_{i,j})-f_{\bar{s}},i,j| \leq \epsilon_1$, $$\sum_{j=1}^{n}|O_{fuzzy}(X_{i,j}) - f_{\bar{s},i,j}| \leq \epsilon_2 \quad (\epsilon_1 < 1/m \text{ and } \epsilon_1 < \epsilon_2 < N \cdot \epsilon_1).$$

Fuzzy system $MFS_i$ is defined by membership functions, fuzzy rules and defuzzification method. According to the membership functions for each $t_i, t_i=1,2,\ldots,\tau_i$, the membership function for variable $x_i$ at fuzzy interval $S_{i,t}$ is $\mu_{i,t_i}$. The fuzzy rules provide that for each $t_i$, $t_i=1,2,\ldots,\tau_i$, and if $X_i$ is $S_{i,t_i}$ then the $\bar{s}$-th output=$O_{\bar{s}},i,t_i$. According to the defuzzification method, $$\bar{s} - th \, Output \, O_{fuzzy} = \sum_{t_i=1}^{\tau_j} \mu_{i,t_i}(X_i) \cdot O_{\bar{s},i,t_i}$$

Then the fuzzy sample set $$D = \left\{\left(\overline{X}_j, \sum_{\bar{s} \in S}(a_{\bar{s}} \cdot f_{\bar{s},1,j} \cdot f_{\bar{s},2,j} \cdots f_{\bar{s},m,j})\right) \bigg| j=1,2,\ldots,N\right\}$$

$(|a_{\bar{s}}| \leq Q)$ can be described by the following fuzzy system MFS, with its maximum error and total error being given, respectively, by $$\max_{j \in \{1,2,\ldots,N\}}\left|O_{fuzzy}(\overline{X}_j) - \sum_{\bar{s} \in S}(a_{\bar{s}} \cdot f_{\bar{s},1,j} f_{\bar{s},2,j} \cdots f_{\bar{s},m,j} \cdots f_{\bar{s},m,j})\right| \leq$$

$$Q|S|\left(m\epsilon_1 + O\left(\frac{1}{2}(m\epsilon_1)^2\right)\right),$$

and $$\sum_{j=1}^{N}\left|O_{fuzzy}(\overline{X}_j) - \sum_{\bar{s} \in S}(a_{\bar{s}} \cdot f_{\bar{s},1,j} f_{\bar{s},2,j} \cdots f_{\bar{s},m,j})\right| \leq$$

$$\left(1 + \frac{1}{2}m\epsilon_1 + O\left(\frac{1}{6}(m\epsilon_1)^2\right)\right)mQ|S|\epsilon_2.$$

The fuzzy system MFS is also defined by membership functions, fuzzy rules and defuzzification method. According to the membership functions, for each pair of $(i,t_i),i,1,2,\ldots,m;t_i=1,2,\ldots,\tau_i$, the membership function for variable $x_i$ at fuzzy interval $S_{i,t_i}$ is $\mu_{i,t_i}$. The fuzzy rules provide that for each m-tuple $(t_1,t_2,\ldots,t_m)$, $t_1=1,2,\ldots,\tau_1;t_2=1,2,\ldots,\tau_2;\ldots;t_m=1,2,\ldots,\tau_m$, if $X_1$ is $S_{1,t_1}$ and $X_2$ is $S_{2,t_2}$ and $\ldots$ and $X_m$ is $S_{m,t_m}$ then $$Output = O_{t_1,t_2,\ldots,t_m} = \sum_{\bar{s} \in S}\left(a_{\bar{s}} \cdot \prod_{i=1}^{m} O_{\bar{s},i,t_i}\right).$$

According to the defuzzification method, $$O_{fuzzy} = \sum_{\substack{t_j=1,2,\ldots,\tau_j \\ i=1,2,\ldots,m}}\left(\prod_{l=1}^{m}\mu_{i,t_i}(X_i) \cdot O_{t_1,t_2,\ldots,t_m}\right)$$

Theorem 1 ensures the decomposition of the sample set into a number of sample set clusters, which form the basis for the decomposition process of the method of the present invention. That is, Theorem 1 ensures the existence of set cluster $$A = \left\{A_{\bar{s}} = \{(\overline{X}_j, F_{\bar{s}j}|j=1,2,\ldots,N\}|\bar{s}=(s_1,s_2,\ldots,s_{2m}) \in S\},\right.$$

$$\text{such that } Y_j = \sum_{\bar{s} \in S}F_{\bar{s}j}.$$

Theorem 2 ensures the construction and composition of decomposed single input fuzzy systems to recover the fuzzy system on the original sample set $\Lambda$. That is, Theorem 2 shows that, once the membership functions and fuzzy rules of each variable $X_i$ are computed on sample set $$\tilde{B}_i = \left\{ \left( X_{i,j}, \left\{ \cos\left(\frac{2\pi s_{2i-1}}{U_i - L_i} \cdot \left(X_{i,j} - \frac{U_i - L_i}{2}\right) + s_{2i} \cdot \frac{\pi}{2}\right) \right. \right. \right.$$
$$\left. \left. \left| \bar{s} = (s_1, s_2, \ldots, s_{2m}) \in S \right\} \right\} \bigg| j = 1, 2, \ldots, N \right\}$$

the fuzzy system appropriate for A may be constructed by following the steps of Theorem 2.

The present invention also makes use of two supplementing methods, which are the decomposition method and the method for obtaining the fuzzy systems on sample sets $\tilde{B}_i$ (i=1,2, ... ,m). They will be described below.

Decomposition Method

Knowledge on the sample set as well as on the smoothness of an object surface plays an important role in the analysis used by the present invention. Suppose that the object system does not include higher components than $2\pi\tau_i/(U_i-L_i)$ for each variable $X_i$. Then it is possible to select an $S = \{(s_1, s_2, \ldots, s_{2m})\}$ where $s_1 \leq \tau_1, s_3 \leq \tau_2, \ldots, s_{2m-1} \leq \tau_m$. An optimal approximation to the sample set can be obtained by minimizing the following function:

$$E = \frac{1}{2} \tag{1}$$

$$\left( Y_j - \sum_{\bar{s}=(s_1, s_2, \ldots, s_{2m}) \in S} \left( a_{\bar{s}} \prod_{i=1}^{m} \cos\left(\frac{2\pi s_{2i-1}}{U_i - L_i} \cdot \left(X_{i,j} - \frac{U_i - L_i}{2}\right) + s_{2i} \cdot \frac{\pi}{2}\right) \right) \right)^2$$

This is equivalent to finding the roots of the equations $\partial E / \partial a_{\bar{s}} = 0$. Some care must be taken in the process so that all terms of equal wave numbers are collected into one term, not retaining any two identical terms differing only in coefficients. For example, the two terms $$a_{(0,0,1,0)} \cos(0) \cdot \cos\left(\frac{2\pi s_1}{U_1 - L_1} \cdot \left(X_2 - \frac{U_1 - L_1}{2}\right)\right) \text{ and}$$

$$a_{(0,1,1,0)} \cos\left(\frac{\pi}{2}\right) \cdot \cos\left(\frac{2\pi s_1}{U_1 - L_1} \cdot \left(X_2 - \frac{U_1 - L_1}{2}\right)\right)$$

should be combined into $$a'_{(0,0,1,0)} \cos(0) \cdot \cos\left(\frac{2\pi s_1}{U_1 - L_1} \cdot \left(X_2 - \frac{U_1 - L_1}{2}\right)\right)$$

before the coefficients of the terms of Fourier series are determined. After the identical terms have been combined, suppose at this time, $S = (\bar{s}_1, \bar{s}_2, \ldots, \bar{s}_\tau)$, with $\bar{s}_k = (s_{k_1}, s_{k_2}, s_{k_{2m}})$, k=1,2, ... ,τ, the $a_{\bar{s}_k}$ can be obtained by any Standard Gaussian Elimination or by the following computation:

$$a_{\bar{s}_k} = \frac{|T^k_{p,q}|_{\tau \times \tau}}{|J_{p,q}|_{\tau \times \tau}} \text{ where} \tag{2}$$

$$J_{p,q} = \sum_{j=1}^{N} \prod_{i=1}^{m} \left( \cos\left(\frac{2\pi s_{p2i-1}}{U_i - L_i} \cdot \left(X_{i,j} - \frac{U_i - L_i}{2}\right) + s_{p2i} \cdot \frac{\pi}{2}\right) \right.$$
$$\left. \cos\left(\frac{2\pi s_{q2i-1}}{U_i - L_i} \cdot \left(X_{i,j} - \frac{U_i - L_i}{2}\right) + s_{q2i} \cdot \frac{\pi}{2}\right) \right) \text{ and}$$

$$T^k_{p,q} =$$

-continued $$\begin{cases} \sum_{j=1}^{N} Y_j \prod_{i=1}^{m} \cos\left(\frac{2\pi s_{k2i-1}}{U_i - L_i} \cdot \left(X_{i,j} - \frac{U_i - L_i}{2}\right) + s_{k2i} \cdot \frac{\pi}{2}\right) & \text{if } q = k \\ \sum_{j=1}^{N} \sum_{i=1}^{m} \left( \cos\left(\frac{2\pi s_{p2i-1}}{U_i - L_i} \cdot \left(X_{i,j} - \frac{U_i - L_i}{2}\right) + s_{p2i} \cdot \frac{\pi}{2}\right) \\ \cos\left(\frac{2\pi s_{q2i-1}}{U_i - L_i} \cdot \left(X_{i,j} - \frac{U_i - L_i}{2}\right) + s_{q2i} \cdot \frac{\pi}{2}\right) \right) & \text{if } q \neq k \end{cases}$$

In case the sample data fall exactly on the multidimensional grids, a standard Fast Fourier Transform method can be employed to speed up this process.

Generating Single Input Multiple Outputs Fuzzy Systems

With reference to the neural network of FIG. 1, when each of the link weights $b_{it,k}$ between the second layer neuron and the third layer neuron can be interpreted as a rule: "if $X_i$ is $S_{i,t}$ then the output of $f_k$ is $b_{it,k}$", then the relationship between the input and outputs of the neural network, $f_k = b_{i1,k}\mu_{i1}(X_i) + b_{i2,k}\mu_{i2}(X_i) + \ldots + b_{i\tau_i,k}\mu_{i\tau_i}(X_i)$ can be described by the fuzzy system S, in which the membership functions provide that for each t, where t=1,2, ... ,$\tau_i$, the membership function of fuzzy interval $S_{i,t}$ is $\mu_{i,t}$; and the fuzzy rules provide that for each pair of (t, k) where t=1,2, ... ,$\tau_i$; k=1,2, ... ,τ, if $X_i$ is $S_{i,t}$ then the output of $f_k = b_{it,k}$. According to the defuzzification method, output of $$f_k = \sum_{t=1}^{\tau_i} \mu_{i,t}(X_i) b_{it,k}.$$

Thus, the task of obtaining the membership functions and fuzzy rules of each variable $X_i$ reduces to training the neural network of FIG. 1 using the set $\tilde{B}_i$ as its sample set. The membership functions of each variable can either be of "straight" type or continuous type. The Steepest Descent (SD) method such as that taught by Cauchy, "Methode Generale pour la Resolution des Systems d'Equations Simultaneos", Comp. Rend. Acad. Sci. Paris, pp. 536–538, 1847, can be used to train these individual networks.

FIG. 2 summarizes the method of the present invention for the automatic generation of a multivariable fuzzy system from a sample set. To demonstrate the inventive algorithm, which will be referred to herein as algorithm FouNeuFuz, we will begin by supposing that we need to develop the fuzzy system on sample set A with the maximum error and the total error of $\epsilon_1$ and $\epsilon_2$ respectively, such that max $$\max_{j \in \{1,2,\ldots,N\}} |O_{fuzzy}(\bar{X}_j) - Y_j| \leq \varepsilon_1, \text{ and } \sum_{j=1}^{n} |O_{fuzzy}(\bar{X}_j) - Y_j| \leq \varepsilon_2.$$

As shown in FIG. 2, the method begins by decomposing the sample set Λ, step 100, into the sample set cluster $\tilde{A} = \{A_{\bar{s}} | \bar{s} \in S\}$ by minimizing Equation (1) using Gaussian Elimination method or by Equation (2). At step 110, the maximum error and the total errors are calculated:

$$\varepsilon_{fl} = \max_{j \in \{1,2,\ldots,N\}} \left| Y_j - \right.$$

-continued $$\sum_{\bar{s}=(s_1,s_2,\ldots,s_{2m})\in S}\left(a_{\bar{s}}\prod_{i=1}^{m}\cos\left(\frac{2\pi s_{2i-1}}{U_i-L_i}\cdot\left(X_{i,j}-\frac{U_i-L_i}{2}\right)+s_{2i}\cdot\frac{\pi}{2}\right)\right),$$

$$\varepsilon_{f2}=\sum_{j=1}^{N}\left|Y_j-\sum_{\bar{s}=(s_1,s_2,\ldots,s_{2m})\in S}\left(a_{\bar{s}}\prod_{i=1}^{m}\cos\left(\frac{2\pi s_{2i-1}}{U_i-L_i}\cdot\left(X_{i,j}-\frac{U_i-L_i}{2}\right)+s_{2i}\cdot\frac{\pi}{2}\right)\right)\right|.$$

The error requirement is then verified, step 120, by making sure that $\epsilon_{f1}\leq\epsilon_1$ and $\epsilon_{f2}\leq\epsilon_2$. If it is not so, terms with higher frequency are added and the calculation of steps 100 and 110 are repeated until satisfied.

At step 130, for each variable $X_i$, the fuzzy rules and membership functions on sample set $\tilde{B}_i$ are obtained by training the neural network as shown in FIG. 1 by the steepest descent (SD) method, where we choose $$\tilde{B}_i=\left\{\left(X_{i,j},\left\{\cos\left(\frac{2\pi s_{2i-1}}{U_i-L_i}\cdot\left(X_{i,j}-\frac{U_i-L_i}{2}\right)+s_{2i}\cdot\frac{\pi}{2}\right)\right.\right.\right.$$
$$\left.\left.\left.|\bar{s}=(s_1,s_2,\ldots,s_{2m})\in S\right\}\right)\right|j=1,2,\ldots,N\right\},$$

the terminating condition of training each network is set as: max $$\max_{j\in\{1,2,\ldots,N\}}|O_{fuzzy}(X_{i,j})-f_{\bar{s},i,j}|\leq\varepsilon_{s1}=\min\left\{\frac{1}{m},\frac{\varepsilon_1-\varepsilon_{f1}}{mQ|S|}\right\}\text{ and}$$

$$\sum_{j=1}^{n}|O_{fuzzy}(X_{i,j})-f_{\bar{s},i,j}|\leq\varepsilon_{s2}=\frac{\varepsilon_2-\varepsilon_{f2}}{mQ|S|\left(1+\frac{1}{2}m\varepsilon_{s1}\right)}$$

for each output of the networks, where
Q=max {|a$_{\bar{s}}$|}.

The fuzzy rules and the membership functions are then accumulated, step 140, into an integrated fuzzy system on sample set Λ according to Theorem 2.

The invention as described can be used to obtain a fuzzy system automatically using given sample data, rather than to design the fuzzy system manually as is often done in practice in the prior art. Such a fuzzy system has many practical applications. For example, in the industrial motor control field, it is necessary to model the relationship between magnetizing current and the slip frequency. However, the magnetizing current is a non-linear function of the slip frequency, the rotor time constant, the rotor leakage factor, and a non-constant offset current. What we have at hand are only a set of sample data, each of which indicates just the real magnetizing current in a special situation with known slip frequency, rotor time constant, rotor leakage factor, and offset current. According to the prior art, an attempt would be made to obtain the fuzzy system manually describing the relationship, but this is extremely time consuming and difficult for non-specialists. With the use of the novel methods described in the present invention, the fuzzy system can be obtained automatically and directly from the sample set.

Another example is for the fuzzy controller of a washing machine. Here it is necessary to control the water requirement in subsequent washing steps based on the data of laundry load, water absorption speed, water absorption volume, and water temperature. We have only at hand the sample sets consisting of the data indicating the experts' suggested water requirement in sub sequential washing steps for some special (individual) situation with known laundry load, water absorption speed, water absorption volume and water temperature. With the present invention, it is possible to obtain the fuzzy system which can suggest the requirement of water in sub sequential washing step (output) based on the laundry load, water absorption speed, water absorption volume and water temperature (Input). In the above applications, the method of the present invention may be used to obtain 4 inputs-1 output fuzzy systems from sample data sets.

The foregoing descriptions and drawings should be considered as illustrative only of the principles of the invention. The invention may be configured in a number of ways and is not limited by the specific configuration of the preferred embodiment. Numerous applications of the present invention will readily occur to those skilled in the art, various manufacturing processes, robotics, consumer products such as heat exchangers, warm water pressure control, aircraft flight control, robot control and manipulation, car speed control, power systems and nuclear reactor control, control of a cement kiln, focusing of a camcorder, climate control for buildings, train scheduling, pattern recognition and system modeling, stock trading on a stock exchange and information retrieval, to mention only a few. Therefore, it is not desired to limit the invention to the specific examples disclosed or the exact operation shown and described. Rather, all suitable modifications and equivalents may be resorted to, falling within the scope of the invention.

What is claimed is:

1. A method for the automatic generation of a multivariable fuzzy system from a sample set for use in a control system having a plurality of inputs, comprising the steps of:

decomposing a sample set Λ into a sample set cluster A={A$_{\bar{s}}$|$\bar{s}\in$S};

calculating maximum error and total error;

verifying that the maximum error and the total error are equal to or less than respective threshold values;

obtaining a fuzzy system for each variable;

accumulating a final fuzzy system on the sample set A; and applying the final fuzzy system to the control system such that said control system generates, in an automated manner using said final fuzzy system, an output based on said plurality of inputs to control operation of an associated mechanical or electrical device or system.

2. The method as set forth in claim 1, the step of calculating maximum error and total error being performed using respective equations, $$\varepsilon_{f1}=\max_{j\in\{1,2,\ldots,N\}}\left|Y_j-\right.$$

$$\sum_{\bar{s}=(s_1,s_2,\ldots,s_{2m})\in S}\left(a_{\bar{s}}\prod_{i=1}^{m}\cos\left(\frac{2\pi s_{2i-1}}{U_i-L_i}\cdot\left(X_{i,j}-\frac{U_i-L_i}{2}\right)+s_{2i}\cdot\frac{\pi}{2}\right)\right),$$

$$\varepsilon_{f2}=\sum_{j=1}^{N}\left|Y_j-\sum_{\bar{s}=(s_1,s_2,\ldots,s_{2m})\in S}\left(a_{\bar{s}}\prod_{i=1}^{m}\cos\left(\frac{2\pi s_{2i-1}}{U_i-L_i}\cdot\right.\right.\right.$$

$$\left(X_{i,j} - \frac{U_i - L_i}{2}\right) + s_{2i} \cdot \frac{\pi}{2}\right)\right|.$$

3. The method as set forth in claim 2, the step of verifying including ensuring that $\epsilon_{f1} \leq \epsilon_1$ and $\epsilon_{f2} \leq \epsilon_2$ and, in response to a negative outcome, including the step of adding terms with higher frequency and repeating the steps of decomposing and calculating until $\epsilon_{f1} \leq \epsilon_1$ and $\epsilon_{f2} \leq \epsilon_2$.

4. The method as set forth in claim 1, the step of obtaining a fuzzy system for each variable including the steps of, for each variable $X_i$, obtaining fuzzy rules and membership functions on sample set $\tilde{B}_i$ by training a neural network where $$\tilde{B}_i = \left\{\left(X_{i,j}, \left\{\cos\left(\frac{2\pi s_{2i-1}}{U_i - L_i} \cdot \left(X_{i,j} - \frac{U_i - L_i}{2}\right) + s_{2i} \cdot \frac{\pi}{2}\right)\right.\right.\right.$$
$$\left.\left.\left.|\bar{s} = (s_1, s_2, \ldots, s_{2m}) \in S\right\}\right| j = 1, 2, \ldots, N\right\},$$

the terminating condition of training each network is set as $$\max_{j \in \{1,2,\ldots,N\}} |O_{fuzzy}(X_{i,j}) - f_{s,i,j}| \leq \varepsilon_{s1} =, \min\left\{\frac{1}{m}, \frac{\varepsilon_1 - \varepsilon_{f1}}{mQ|S|}\right\}$$

and $$\sum_{j=1}^{n} |O_{fuzzy}(X_{i,j}) - f_{s,i,j}| \leq \varepsilon_{s2} = \frac{\varepsilon_2 - \varepsilon_{f2}}{mQ|S|\left(1 + \frac{1}{2}m\varepsilon_{s1}\right)}$$

for each output of the network, where $Q = \max\{|a_{\bar{s}}|\}$.

5. The method as set forth in claim 1, wherein said associated device is a washing machine, said plurality of inputs include values for laundry load, water absorption speed, water absorption volume and water temperature, and said output is a water requirement value.

6. The method as set forth in claim 1, wherein said associated device is a motor, said plurality of inputs include values for slip frequency, rotor time constant, rotor leakage factor and offset current, and said output is a magnetizing current value.

7. The method as set forth in claim 1, wherein said associated device or system is a mechanical household appliance.

8. A method for the automatic generation of a multivariable fuzzy system from a sample set for use in a control system having a plurality of inputs, comprising the steps of:

decomposing a sample set $\Lambda$ into a sample set cluster $\Lambda = \{\Lambda_s | s \in S\}$;

calculating maximum error and total error using respective equations $$\varepsilon_{f1} = \max_{j \in \{1,2,\ldots,N\}}$$

$$\left|Y_j - \sum_{s=(s_1,s_2,\ldots,s_{2m}) \in S} \left(a_s \prod_{i=1}^{m} \cos\left(\frac{2\pi s_{2i-1}}{U_i - L_i} \cdot \left(X_{i,j} - \frac{U_i - L_i}{2}\right) + s_{2i} \cdot \frac{\pi}{2}\right)\right)\right|,$$

$$\varepsilon_{f2} = \sum_{j=1}^{n} \left|Y_j - \sum_{s=(s_1,s_2,\ldots,s_{2m}) \in S} \left(a_s \prod_{i=1}^{m} \cos\left(\frac{2\pi s_{2i-1}}{U_i - L_i} \cdot \left(X_{i,j} - \frac{U_i - L_i}{2}\right) + s_{2i} \cdot \frac{\pi}{2}\right)\right)\right|,$$

verifying that $\epsilon_{f1} \leq \epsilon_1$ and $\epsilon_{f2} \leq \epsilon_2$ and, in response to a negative outcome, adding terms with higher frequency and repeating the steps of decomposing and calculating until $\epsilon_{f1} \leq \epsilon_1$ and $\epsilon_{f2} \leq \epsilon_2$;

obtaining a fuzzy system by each variable $X_i$, including fuzzy rules and membership functions on sample set $\tilde{B}_i$ by training a neural network where $$\tilde{B}_i =$$
$$\left\{\left(X_{i,j}\left\{\cos\left(\frac{2\pi s_{2i-1}}{U_i - L_i} \cdot \left(X_{i,j} - \frac{U_i - L_i}{2}\right) + s_{2i} \cdot \frac{\pi}{2}\right)\middle|\bar{s} = (s_1, s_2, \ldots, s_{2m}) \in S\right\}\right)\right|$$
$$j = 1, 2, \ldots, N\right\},$$

the terminating condition of training each network is set as $$\max_{j \in \{1,2,\ldots,N\}} |O_{fuzzy}(X_{i,j}) - f_{s,i,j}| \leq \varepsilon_{s1} =, \min\left\{\frac{1}{m}, \frac{\varepsilon_1 - \varepsilon_{f1}}{mQ|S|}\right\}$$

and $$\sum_{j=1}^{n} |O_{fuzzy}(X_{i,j}) - f_{s,i,j}| \leq \varepsilon_{s2} = \frac{\varepsilon_2 - \varepsilon_{f2}}{mQ|S|\left(1 + \frac{1}{2}m\varepsilon_{s1}\right)}$$

for each output of the network, where $Q = \max\{|a_{\bar{s}}|\}$;

accumulating a final fuzzy system on the sample set $\Lambda$;

applying the final fuzzy system to the control system such that said control system generates, in an automated manner using said final fuzzy system, an output based on said plurality of inputs to control operation of an associated mechanical or electrical device or system.

9. The method as set forth in claim 8, wherein said associated device is a washing machine, said plurality of inputs include values for laundry load, water absorption speed, water absorption volume and water temperature, and said output is a water requirement value.

10. The method as set forth in claim 8, wherein said associated device is a motor, said plurality of inputs include values for slip frequency, rotor time constant, rotor leakage factor and offset current, and said output is a magnetizing current value.

11. The method as set forth in claim 8, wherein said associated device or system is a mechanical household appliance.

* * * * *